United States Patent
Kuo et al.

(10) Patent No.: US 7,777,915 B2
(45) Date of Patent: Aug. 17, 2010

(54) IMAGE CONTROL SYSTEM AND METHOD

(75) Inventors: Chung-Hui Kuo, Fairport, NY (US); Eric K. Zeise, Pittsford, NY (US); Di Lai, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 572 days.

(21) Appl. No.: 11/453,353

(22) Filed: Jun. 15, 2006

(65) Prior Publication Data

US 2007/0291289 A1  Dec. 20, 2007

(51) Int. Cl.
G06F 15/00 (2006.01)
H04N 1/46 (2006.01)
G06K 9/00 (2006.01)

(52) U.S. Cl. .................. 358/1.9; 358/1.15; 358/504; 382/164

(58) Field of Classification Search .............. 358/1.9, 358/3.27, 1.13, 504, 505, 530, 538, 525, 358/1.15, 1.1, 518; 382/162, 165, 173, 254
See application file for complete search history.

(56) References Cited

U.S. PATENT DOCUMENTS

| | | | |
|---|---|---|---|
| 5,339,176 A * | 8/1994 | Smilansky et al. .......... 358/504 |
| 5,963,201 A * | 10/1999 | McGreggor et al. ......... 715/722 |
| 6,005,968 A | 12/1999 | Granger | |
| 6,867,864 B2 | 3/2005 | Overbeck et al. | |
| 6,961,461 B2 | 11/2005 | MacKinnon et al. | |
| RE38,986 E | 2/2006 | Baker | |
| 2003/0168582 A1 * | 9/2003 | Bala et al. ................... 250/234 |
| 2005/0072908 A1 | 4/2005 | Grunert et al. | |
| 2005/0094871 A1 * | 5/2005 | Berns et al. ................. 382/162 |
| 2005/0281459 A1 | 12/2005 | Bala et al. | |
| 2006/0072128 A1 * | 4/2006 | Ng et al. ..................... 358/1.9 |
| 2006/0170938 A1 * | 8/2006 | Ibarluzea et al. ............ 358/1.9 |
| 2007/0097461 A1 * | 5/2007 | Ng et al. .................... 358/504 |
| 2007/0146829 A9 * | 6/2007 | Coons et al. ................ 358/504 |
| 2007/0236736 A1 * | 10/2007 | Tai et al. ................... 358/3.01 |

OTHER PUBLICATIONS

Scanner-based Macroscopic Color Variation Estimation, by Chunghui Kuo, Di Lai and Eric Zeise.

* cited by examiner

Primary Examiner—Madeleine A Nguyen
(74) Attorney, Agent, or Firm—Donna P. Suchy (57) ABSTRACT

A color image control system and method are provided for improving the image control of printing systems, including digital front-end processors, color printers and post-finishing system. This automatic image control system, including measurement and calibration, by registering the captured reproduced document with the extracted virtual device document and automatically locating a plurality of regions in which to measure captured color values, using colorimetric measurements of an aim reproduction of the document at these same region positions, and finally relating the captured color values, the colorimetric color values, and the virtual device color values to create the an accurate color mapping. One embodiment of this method combines a global regression polynomial with local mapping refinement.

14 Claims, 5 Drawing Sheets
(1 of 5 Drawing Sheet(s) Filed in Color)

*FIG. 3a* ORIGINAL DOCUMENT

*FIG. 3b* REPRODUCED DOCUMENT

IMAGE CONTROL SYSTEM AND METHOD

FIELD OF THE INVENTION

The invention relates generally to the field of printing, and more particularly to processes and apparatus for enhancing color in digital color reproduction systems.

BACKGROUND OF THE INVENTION

Digital color reproduction printing systems typically include digital front-end processors, digital color printers, and post finishing systems (e.g., UV coating system, glosser system, laminator system, etc). These systems reproduce original color onto substrates (such as paper). The digital front-end processes take input electronic files (such as PDF or postscript files) composed of imaging commands and/or images from other input devices (e.g., a scanner, a digital camera) together with its own internal other function processes (e.g., raster image processor, image positioning processor, image manipulation processor, color processor, image storage processor, substrate processor, etc) to rasterize the input electronic files into proper image bitmaps for the printer to print. An operator may be assisted to set up parameters such as layout, font, color, paper, post-finishing, and etc among those digital font-end processes. The printer (e.g., an electrographic printer) takes the rasterized bitmap and renders the bitmap into a form that can control the printing process from the exposure device to writing the image onto paper. The post-finishing system finalizes the prints by adding finishing touches such as protection, glossing, and binding etc.

In an electrophotographic modular printing machine of known type, for example, the Eastman Kodak NexPress 2100 printer manufactured by Eastman Kodak, Inc., of Rochester, N.Y., color toner images are made sequentially in a plurality of color imaging modules arranged in tandem, and the toner images are successively electrostatically transferred to a receiver member adhered to a transport web moving through the modules. Commercial machines of this type typically employ intermediate transfer members in the respective modules for the transfer to the receiver member of individual color separation toner images. In other printers, each color separation toner image is directly transferred to a receiver member.

Electrophotographic printers having multicolor capability are known to also provide an additional toner depositing assembly for depositing clear toner. The provision of a clear toner overcoat to a color print is desirable for providing protection of the print from fingerprints and reducing certain visual artifacts. However, a clear toner overcoat will add cost and may reduce the color gamut of the print; thus, it is desirable to provide for operator/user selection to determine whether or not a clear toner overcoat will be applied to the entire print. In U.S. Pat. No. 5,234,783, issued on Aug. 10, 1993, in the name of Yee S. Ng, it is noted that in lieu of providing a uniform layer of clear toner, a layer that varies inversely in thickness according to heights of the toner stacks may be used instead as a compromise approach to establishing even toner stack heights. As is known, the respective color toners are deposited one upon the other at respective locations on the receiver member and the height of a respective color toner stack is the sum of the toner contributions of each respective color and so the layer of clear toner provides the print with a more even or uniform gloss.

In U.S. patent application Ser. No. 11/062,972, filed on Feb. 22, 2005, in the names of Yee S. Ng et al., a method is disclosed of forming a print having a multicolor image supported on a receiver member wherein a multicolor toner image is formed on the receiver member by toners of at least three different colors of toner pigments which form various combinations of color at different pixel locations on the receiver member to form the multicolor toner image thereon; forming a clear toner overcoat upon the multicolor toner image, the clear toner overcoat being deposited as an inverse mask; pre-fusing the multicolor toner image and clear toner overcoat to the receiver member to at least tack the toners forming the multicolor toner image and the clear toner overcoat; and subjecting the clear toner overcoat and the multicolor toner image to heat and pressure using a belt fuser to provide an improved color gamut and gloss to the image. The inverse masks, the pre-fusing conditions, and the belt fuser set points can be optimized based on receiver member types to maximize the color gamut. However, due to the many variables that occur before, during and after printing, there is a need for a better, more efficient and cost effective way to correct for color inaccuracies.

Color inaccuracies occur in all printing systems, including the electrophotographic printing systems. The system environment can change when components, such as the fuser roller, change their operational characteristics over time. Typically linearization processes are used to re-calibrate the printer system, in conjunction with the use of other devices, so that the digital front-end processors are more independent from printer behavior changes. However, in the whole color reproduction printing system, which includes both printer and post finishing system (e.g., UV coater, glosser, and etc), the linearization process alone cannot fully correct the whole color reproduction system variability with out effective controls and controlling systems, such as effective macroscopic color measurement devices and color measurement systems. Without these controlling systems the resultant colors may be incorrectly shifted (for example, red shift or green shift), and the resulting reproduction may be perceived as unacceptable to the customer. It is important to make corrections and adjustments to recreate the desired perceived colors. However, this can be time consuming and expensive using the current control systems.

The use of scanners, such as flatbed scanners alone has not been successful as a macroscopic color-measuring device since scanners have very different color response characteristics without any standard colorimetric response which limits the utility of a flatbed scanner as a macroscopic color measuring device. For example flatbed scanners first project the entire spectrum of reflected light onto three sensors with long, medium and short wavelength light absorption peaks, denoted as {Red, {Green} and {Blue} sensors.

Scanners, such as flatbed scanners, are not manufactured to a standard color response characteristic and the response characteristics of individual scanners are very different from standard human visual response characteristics and often differ substantially between different models. These features severely limit the utility of a flatbed scanner as a macroscopic color measuring device. Consequently, the calculated metamerism between the device {RGB} color response characteristics and the CIE standardized human visual response characteristics provides a lower bound on color measurement error in color measurements using flatbed scanners.

The present invention overcomes this shortcoming by making image control, including color measurement and control, more efficient and accurate and allowing it to occur automatically during the printing run. The following invention solves the current problems with color image control in a wide variety of situations.

SUMMARY OF THE INVENTION

In accordance with an object of the invention, both a system and a method are provided for improving the image control of printing systems, and specifically the efficiency and accuracy of color image control. The invention is in the field of color reproduction printing systems, which include digital front-end processors, color printers and post-finishing system such as UV coater, glosser, laminator, and etc. More specifically, the invention relates to an automatic image control, including measurement and calibration, by registering the captured reproduced document with the extracted virtual device document and automatically locating a plurality of regions in which to measure captured color values, using colorimetric measurements of an aim reproduction of the document at these same region positions, and finally relating the captured color values, the colorimetric color values, and the virtual device color values to create the an accurate color mapping. One embodiment of this method combines a global regression polynomial with local mapping refinement.

While the specification concludes with claims particularly pointing out and distinctly claiming the subject matter of the present invention, it is believed the invention will be better understood from the following detailed description when taken in conjunction with the accompanying drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

For a better understanding of the characteristics of this invention, the invention will now be described in detail with reference to the accompanying drawings, wherein.

DETAILED DESCRIPTION OF THE INVENTION

The present description will be directed in particular to elements forming part of, or cooperating more directly with, apparatus and methods in accordance with the present invention. It is to be understood that elements not specifically shown or described may take various forms well known to those skilled in the art.

Figure 1:
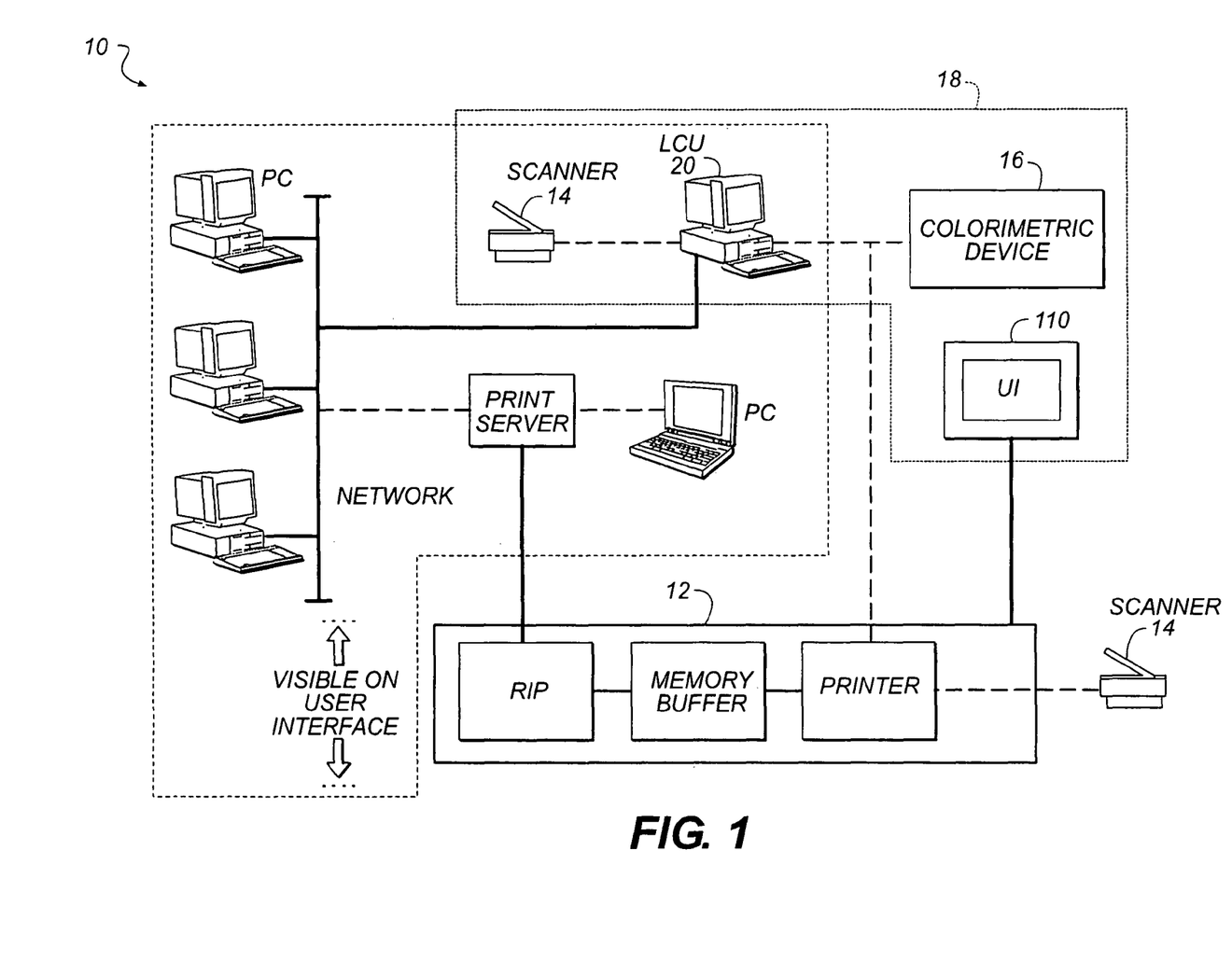
FIG. 1 is a schematic illustration of a printer system according to the present invention for use in conjunction with a image control system and method.

FIG. 1 shows schematically a printing system 10, including an electrophotographic printer or other printing devices 12, sometimes referred to as simply printers but not limited to the traditional printer but also including plate production devices, and copiers that can print on a receiver, such as paper, metal, press sheets, cloth, ceramics and substrates that are printable. Also shown is an image capturing device 14, such as a scanner and or camera or other device with scanning capability and a colorimetric measurement device 16, and related devices and sensors that make up a image control system 18 that will be discussed below in more detail. Electrophotographic printers are well known in the art, and are preferred in many applications; alternatively, other known types of printing systems may be used. Plural writer interfaces and development stations may be provided for developing images in plural colors, or from marking particles of different physical characteristics. Full process color electrophotographic printing is accomplished by utilizing this process for each of four, five or more marking particle colors (e.g., black, cyan, magenta, yellow, and clear).

The image control system 18 includes a controller or logic and control unit (LCU) 20, preferably a digital computer or microprocessor operating according to a stored program for sequentially actuating the workstations within printer system 10, effecting overall control of printer 12 and its various subsystems, including the image capturing device 14, such as a scanner and or camera or other device with scanning capability and a colorimetric measurement device 16, and related devices and sensors. These plus other possible components and software make up the image control system 18, which can be described as a serial combination of digital workflow process and physical printing process. The Logic and Control Unit (LCU) 20 including one or more computers acting in response to signals from various sensors associated with the apparatus provides timing and control signals to the respective components to control the various components and process control parameters of the apparatus in accordance with methods well known by those skilled in the arts. The image control system 18 includes the controller or logic and control unit (LCU) 20, preferably a digital computer or microprocessor operating according to a stored program for sequentially actuating the workstations within printer 12, affecting overall control of printer 10 and its various subsystems. Aspects of process control are described in U.S. Pat. No. 6,121,986 incorporated herein by this reference.

The LCU 20 includes a microprocessor and suitable tables and control software which is executable by the LCU 20. The control software is preferably stored in memory associated with the LCU 20. Sensors associated with the fusing and glossing assemblies, as well as other image quality features, provide appropriate signals to the LCU 20. In any event, the glosser and other image control elements can also have separate controls providing control over items such as the temperature of the glossing roller and the downstream cooling of the fusing belt and control of glossing nip pressure. In response to one or more sensors, the LCU 20 issues command and control signals that adjust all aspects of the image that effect image quality, such as the heat and/or pressure within fusing nip (not shown) so as to reduce image artifacts which are attributable to and/or are the result of release fluid disposed upon and/or impregnating a receiver member that is subsequently processed by/through a finishing device such as a glossing assembly (not shown). Additional elements provided for control may be assembled about the various module elements, such as for example a meter for measuring the uniform electrostatic charge and a meter for measuring the post-exposure color within a patch area of an image area on the printed surface.

The color printing device and system needs to be calibrated and characterized for accurate color reproduction. These include setup of the printer to a standard specification for each color separation as well as printing and measuring large numbers of test patches to construct an accurate color transformation. The color transformation that characterizes the printing system maps color, bi-directionally, between device-dependent color (used in printing a document) and device-independent color (e.g. in the document to be printed). For example, it transforms the device independent CIELAB color system data, defined above, into CMYK data. The color transforms may be stored in a look-up table (LUT) format, in general, for easy access in processing color data. The International Color Consortium (ICC) color profile, which characterizes the printing system, contains multiple color transformation tables in LUT form.

The LCU 20 also is programmed to provide closed-loop control of printer machine 10 in response to signals from various sensors and encoders. Aspects of process control are described in U.S. Pat. No. 6,121,986 incorporated herein by this reference. The printing device prints one or more images in one or more colors, including black and clear. The image may be included in a set of one or more images, such as in images of the pages of a document. An image may be divided into segments, objects, or structures each of which is in itself an image. A segment, object or structure of an image may be of any size up to and including the whole image.

The LCU 20 will typically include temporary data storage memory, a central processing unit, timing and cycle control unit, and stored program control. Data input and output is performed sequentially through or under program control. Input data can be applied through input signal buffers to an input data processor, or through an interrupt signal processor, and include input signals from various switches, sensors, and analog-to-digital converters internal to printing system 10, or received from sources external to printing system 10, such from as a human user or a network control. The output data and control signals from LCU 20 are applied directly or through storage latches to suitable output drivers and in turn to the appropriate subsystems within printing system 10.

Before color control and calibration was supplied using accurate macroscopic color measurement and relied on the use of a colorimetric measurement device 16, such as a colorimeter or a spectrophotometer, to provide a surrogate for human visual response. The colorimetric measurement using a spectrophotometer first estimates the entire spectral response of the reflected light, and then, using standardized response characteristics, converts the spectral response to provide measurements according to color standards, such as {CIE XYZ, {CIELab} and {Reflection Densities} and achieves highly accurate color estimation with small between-instrument and inter-instrument variations.

The traditional scanner calibration utilizes a test target, printed with a fixed set of colorants that samples the entire printer device color space, for example CMYK or RGB. A scan of this well-defined test target provides a representation of the target in Scanner RGB values. A colorimetric measurement device, such as spectrophotometer, is also utilized to provide colorimetric measurements of this same printed test target. A multidimensional color mapping function from the scanner device color space, Scanner RGB, to the colorimetric color space, such as CIELAB, can then be created. Because the scanner is not a colorimetric measurement device, the color mapping function has to be re-created when one or more colorants are changed. Moreover, it is well known that this straightforward approach is not accurate enough for applications demanding high color stability and accuracy.

The image control system 18, including an image capture system adapted to capture a digital image of the receiver after an image has been printed, and to generate captured image data reflecting the appearance of the image on the receiver is shown in FIG. 1. In the image control system 18, the image capturing device 14, for example a flat bed scanner, is used to estimate the macroscopic color variation in print samples by capturing values. When the image capturing device captures the reproduced document to produce a scanned document it will register the captured reproduced document with the extracted virtual device document in such a way that that the ROI values can be determined in a predetermined or automatic manner so that the image capturing device measure the captured color values. When this is done in combination with the printer 12, the image capturing device 14 can automatically monitor the color variation across a series of print samples without human intervention, which significantly reduces the cost of tracking printing process variations. This overcomes the shortcomings of previous printing systems by adjusting the calibration system in such a way that the metamerism induced color error is significantly reduced so that the objective of quantifying the color variations within a printed page or between pages can be achieved.

The image capturing device 14, here shown as the color scanner in the image control system 18, is different from the colorimetric measurement device 16 because of differences in the sensor spectral responsitivities from the responsivities of the CIE standard observer. Thus, observer color metamerism imposes a lower boundary on the measurement error when the image capturing device 14 is used to replace the macroscopic colorimetric measurement device as is done in the image control system 18 and the related method. The image control device is able to benefit from the attributes that the image capturing device 14 has, such as its capability of capturing large areas in fine detail allowing a scanner to quantify microscopic image artifacts and its convenience, efficiency and lower cost. The image control system 18 is able to replace the macroscopic colorimetric measurement device with the image capturing device 14 in the image control system 18 by allowing only one colorant to be present in a test target at a time. As a result, only one-dimensional color information is available to describe the color appearing on the page in a restricted manner.

Reflection densities are a natural choice in this controlled and highly restricted environment. However this constraint cannot be utilized when using the flatbed scanner to measure color with at least two colorants present. A complete color representation requires all three color dimensions, e.g. {L*, a*, b*}, in the CIELAB color space. To reach a compromise between a method, including an algorithm, applicability and transformation accuracy, assume that the printing workflow is transparent to all users. Although this assumption is rather restrictive, for example, when we are asked to evaluate image quality attributes objectively on any given printed target, the printing workflow is usually under control when a set of test targets is sent to a printing system for quality assessment and process diagnosis. As a result, it is reasonable to assume that this prior information with respect to the current printing workflow can be propagated to the following scanning process so as to facilitate the scanner calibration.

Basic subtractive color principles indicates that {cyan, magenta, yellow} can be considered as the complement colors of {red, green, blue} in terms of their spectral responsitivities. Assuming that a flatbed scanner with {Red}, {Green} and {Blue} sensors can reliably quantify the {cyan, magenta and yellow} colors on a reflective print, we can deduce that a fairly accurate color transformation can be constructed when only {cyan, magenta, yellow} colorants are present on a reflective print. However, since CMYK four-color printing (or even more than five colorants) is prevalent in the commercial printing industry, researchers have shown that the presence of the extra black colorant and all supplemental colorants will noticeably degrade the scanner calibration performance. It is possible to extract the supplemental color channel information and utilize this supplemental information in the scanner calibration and color transformation process that is applied to scanned documents in order to evaluate color information. In this particular embodiment, the scanner calibration method, including an algorithm, includes two portions: a quadratic global regression and neural network based residual approximation. The embodiment the data capture device for this method and algorithm can be a flatbed scanner with an automatic document feeder or a high-speed digital camera.

Figure 2:
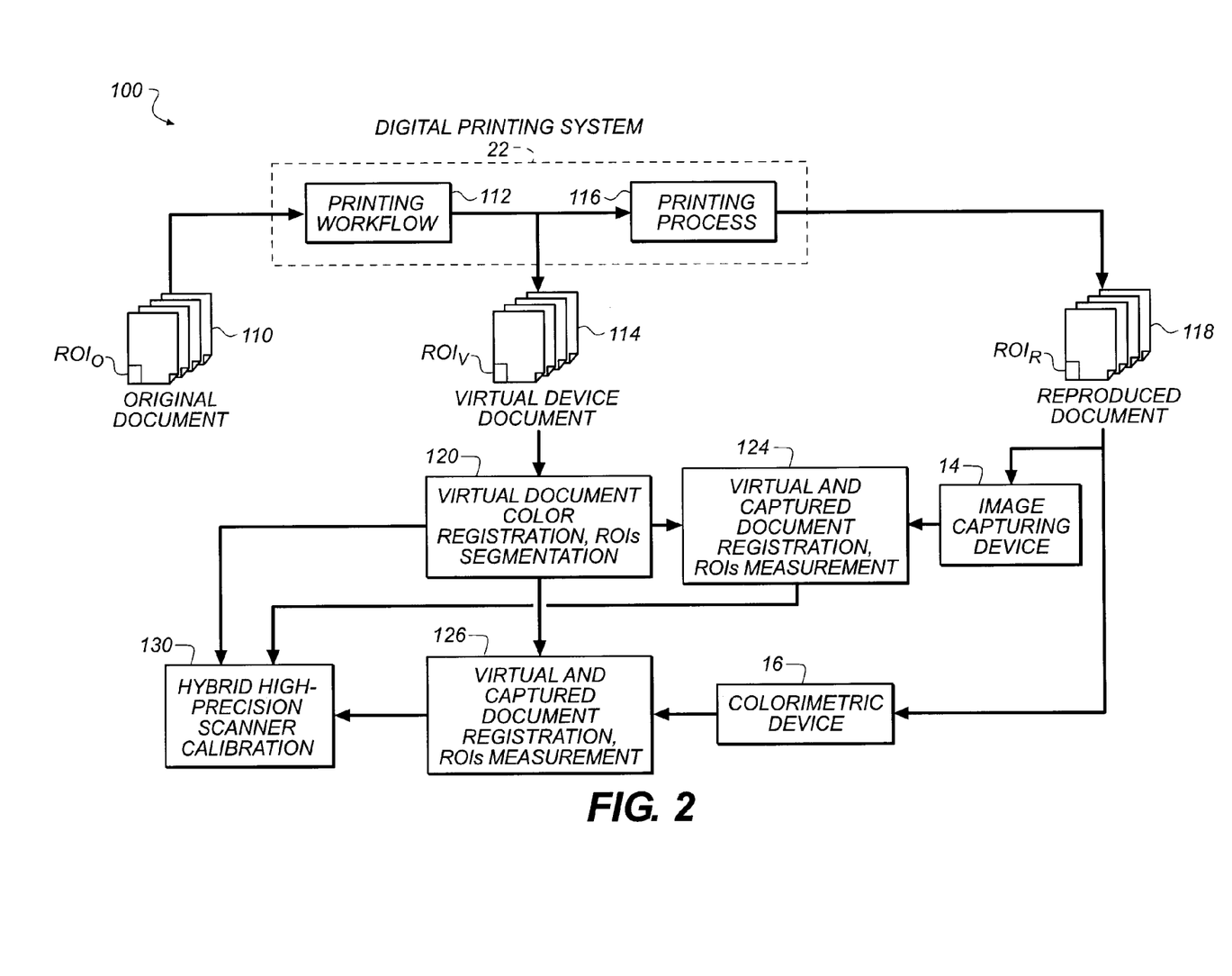
FIG. 2 is a schematic illustration of a image control system according to the present invention for use in conjunction with a print engine or printer apparatus.

FIG. 2, shows a schematic of an embodiment of an image control method 100 that combines the signal from the printing workflow, the printing process, and the scanner to allow a hybrid high-precision scanner calibration to be automatically implemented. By combining the output from the workflow and the printing process, we can automatically extract the exact printer device value for each pixel. For instance, in the traditional 4-color printing process, the composition of C, M, Y and K can be accurately identified. The importance of obtaining the exact composition of the adopted colorants on a printed page is two fold: achieve high accuracy in transforming the scanner into a colorimetric measurement device, and apply this hybrid high-precision color mapping method including an algorithm for automatic process control, system diagnosis (such as grain, mottle, streak, banding, color variation within/between pages), and remote proofing by sending the predicted "Virtual Color Document" to remote customers for verification and approval. The knowledge of the exact composition of the adopted colorants on a printed page enable us to extend the applications from test targets with color patches to any printed document including images, graphics, and color patches.

The inherent RGB sensor design does not allow scanners to accurately characterize the perceived color on a printed page if it is printed by a N-Color printing system when N>3. Traditionally, C, M and Y are basic colorants adopted in a printing system. Besides them, K or other colorants are also commonly adopted for various purposes, such as improving neutrality or colorfulness.

The particular embodiment of an image control method 100 shown in FIG. 2 could be used in conjunction with the image control system 18 described above. In this method 100, an original document 110, such as in the form of a digitized or scanned file, is first sent to the digital printing system 10. A printing workflow 112 that performs appropriate ICC profile color management functions and other image processing processes that are well known by one skilled in the art processes the original document. The ICC profile color management functions are part of an international standard that allows various different input and output color devices such as digital camera, scanner and digital printer to be connected and manages the color profiles such that approximately the same color is represented in each device. In the digital printing system 10, this capability is necessary to appropriately render the original document containing various types of input files on a substrate such as paper.

Figure 3A:
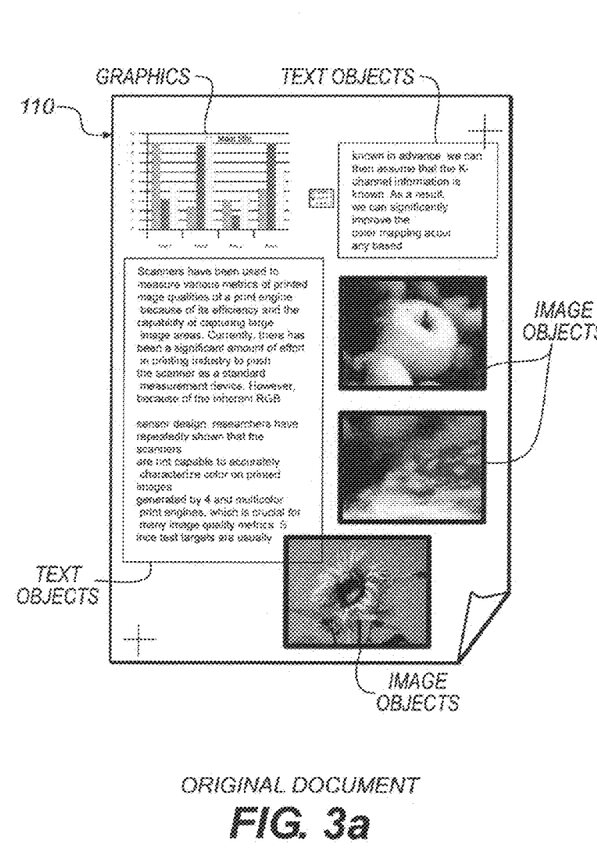
FIG. 3 is a schematic illustration of a representative portion of FIG. 1 showing additional details.
Figure 3B:
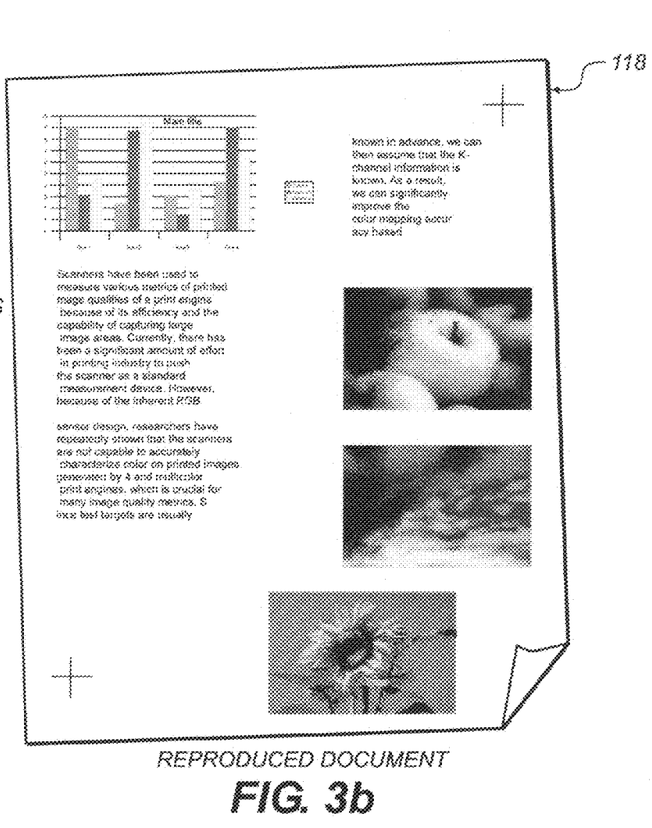

This digital workflow process produces a virtual device document 114, which is saved for the following hybrid high-precision scanner calibration. The virtual device document 114 is also sent to the physical printing process 116 to control the amount and distribution of colorant laid down on the substrate. The objective of the physical printing process is to recreate the original document on a substrate based on the interpretation offered by the previous digital workflow process. Various technologies could be implemented to carry out these steps including Drop On-Demand Ink Jet, Electrophotography, Thermal Dye-Transfer, etc. The output of the physical printing process is denoted as a reproduced document 118. FIGS. 3a and 3b show representative example of the original document 110 and the reproduced document 118 as produced by the image control system and associated method.

During the initial scanner calibration process, an image capture system adapted to capture a digital image of the receiver after an image has been printed, and to generate captured image data reflecting the appearance of the image on the receiver, including the image-capturing device 14, such as a flatbed scanner and/or a digital camera, and the colorimetric measurement device 16, such as a spectrophotometer, separately measure the reproduced document 118 and can be compared using a comparator. The objective is to create an accurate translation process between the image capturing device 14 and the colorimetric measurement device 16 because the colorimetric measurement device closely relates to human visual response while a digital capturing device might not. It is important that the image-capturing device 14 and the colorimetric measurement device 16 are measuring the same location to achieve a valid and accurate translation process.

In order to assure that the image-capturing device 14 and the colorimetric measurement device 16 are measuring the same location, the document sampling locations are automatically identified by the output of the color registration/ROI segmentation process 120 based on the input of virtual device document, where ROI means regions of interest as represented by ROIo (for the original document), ROIv (representing the ROI of the virtual document) and ROIr (representing the ROI of the reproduced document). A clustering technique, such as k-mean clustering algorithm, may be adopted on the virtual device document to identify the locations of regions where their neighboring pixels have similar virtual device values. Regions with dimension smaller than the minimal required size determined by the two measuring devices are discarded to guarantee the validity of the measurement.

The relative locations of ROIv within the virtual device document is fed into the "Virtual/Captured Document Registration and ROI Physical Measurement process" 124. The "virtual/captured document registration and ROI physical measurement process" 126 adopts image registration techniques known in the computer vision art to identify the absolute coordinate of the reproduced document. The relative ROIv locations are first translated into the absolute ROIr location of the reproduced document, and the obtained absolute ROIr locations will control the two color measuring devices to sample the same locations.

In this embodiment, the resultant measurements from the image-capturing device, such as a flatbed scanner or a digital camera, the colorimetric measurement device, and the average virtual device values for all ROIr are fed into the "hybrid high-precision scanner calibration process" 130, where a progressive technique containing the global low degree multidimensional mapping and local mapping accuracy refinement is applied, as described in the following section. The information provided by the virtual device document greatly improves the achievable mapping accuracy compared with any blind color transformation currently in use. This capability of achieving high accuracy makes the following color critical applications possible.

Once the image-capturing device can be treated as a colorimetric measurement device, we can adopt this described technique as above to various digital printing applications. In one application, the original document, a digital printing system including a digital workflow process and physical printing process, and the reproduced document are used as follows. The virtual device document and the captured reproduced document are fed into the "virtual and captured documents registration" to predict the corresponding actual printer device value on the reproduced document based on the corresponding registration points between the virtual device document and the captured reproduced document and to convert captured image data into a virtual device document and segment the virtual device document to identify one or more ROI (region of interest) related to a set of measured scanner RGB color values;

The hybrid high-precision color mapping process predicts the actual perceived color based on the captured reproduced document and the corresponding estimated printer device values. The final output is the "virtual color document" in which the color perceived on the reproduced document is coded in the colorimetric space such as CIELAB standard. Because the virtual color document accurately digitizes the reproduced document based on human perception, this virtual document is very useful for various digital printing applications such as remote proofing, process control and printing failure diagnosis. The image control method may include a transmitting step for transmitting via a transmitting device or transmitter, some or all of the information, or processed subset, of the virtual color document back to the current digital printing system for diagnosis and/or process control (including control of settings), including the control and/or tracking of print artifact s including one or more of the following: granularity, mottle, streak, banding, breakdown spots, gloss artifacts and background or satellite artifacts.

The output from the scanner and the colorimetric measurement device is usually denoted as {RGB} and {LAB}. The hybrid high-precision scanner calibration method, including one or more algorithms, constructs a multidimensional color mapping function from {RGB} and supplemental printer color values to {LAB}. To achieve high mapping precision, a progressive algorithm is used to first model the global mapping behavior from {RGB} to {LAB} by using a low degree multidimensional polynomial, for example, quadratic regression, and then refine the mapping accuracy locally by adopting functions with limited support, for instance, radial basis function, local multidimensional spline functions, support vector regression, or neural network approximation algorithms. To further improve the computational efficiency and utilize the existing color management capability of an imaging system, the obtained multidimensional mapping function can be implemented as a lookup table (LUT). The color mapping accuracy can be shown to improve significantly over calibration approaches based on prior art.

In the calibration method a standard CMYK printing testing target (IT8 target) is printed as two prints on the same machine. One print is used for training purpose and the other is used for testing purpose. Using the training results we can compute the patch lab values of the testing print. Then the ΔE between the computed lab values and instrument measured lab values for all the patches are computed. The table below shows the statistics of the ΔE values:

| Mean | 90 percentile | Stdev | Max | Min |
|---|---|---|---|---|
| 0.6032 | 1.016 | 0.347 | 2.947 | 0.022 |

Various digital printing applications can be achieved with the calibrated scanner based on the hybrid high-precision color mapping method, including one or more algorithms, such as remote proofing, print process control and printing device and system diagnosis. For remote proofing, the reproduced document is first transformed into virtual colorimetric color space denoted as a "virtual color document", which accurately quantifies the appearance of the reproduced document. This "virtual color document" can be sent to remote users electronically, and the user can reproduce this virtual document by printers or monitors to verify remotely with confidence whether the reproduced document is satisfactory, unlike using the simple scanner. This invention allows customers who want to adopt the digital printing technologies as a choice of realizing their works to verify the outcome without being present alongside the printing device and system. Furthermore the identification and correction of print artifacts such as granularity, mottle, streak, band, gloss artifacts, and color variations can be estimated in real time on any printed document. It can provide real time process control and system diagnosis without interruption and avoid wasting colorants on printing any special targets during the print run.

The image control system and associated method in another embodiment shown in FIG. 2 combines the virtual device document 114, the captured reproduced document 118, and colorimetric measurement 140 from the standard 4 color CMYK digital printing system to a color printing system with greater than 4 colors, that is from 5 to N colors.

Figure 4:
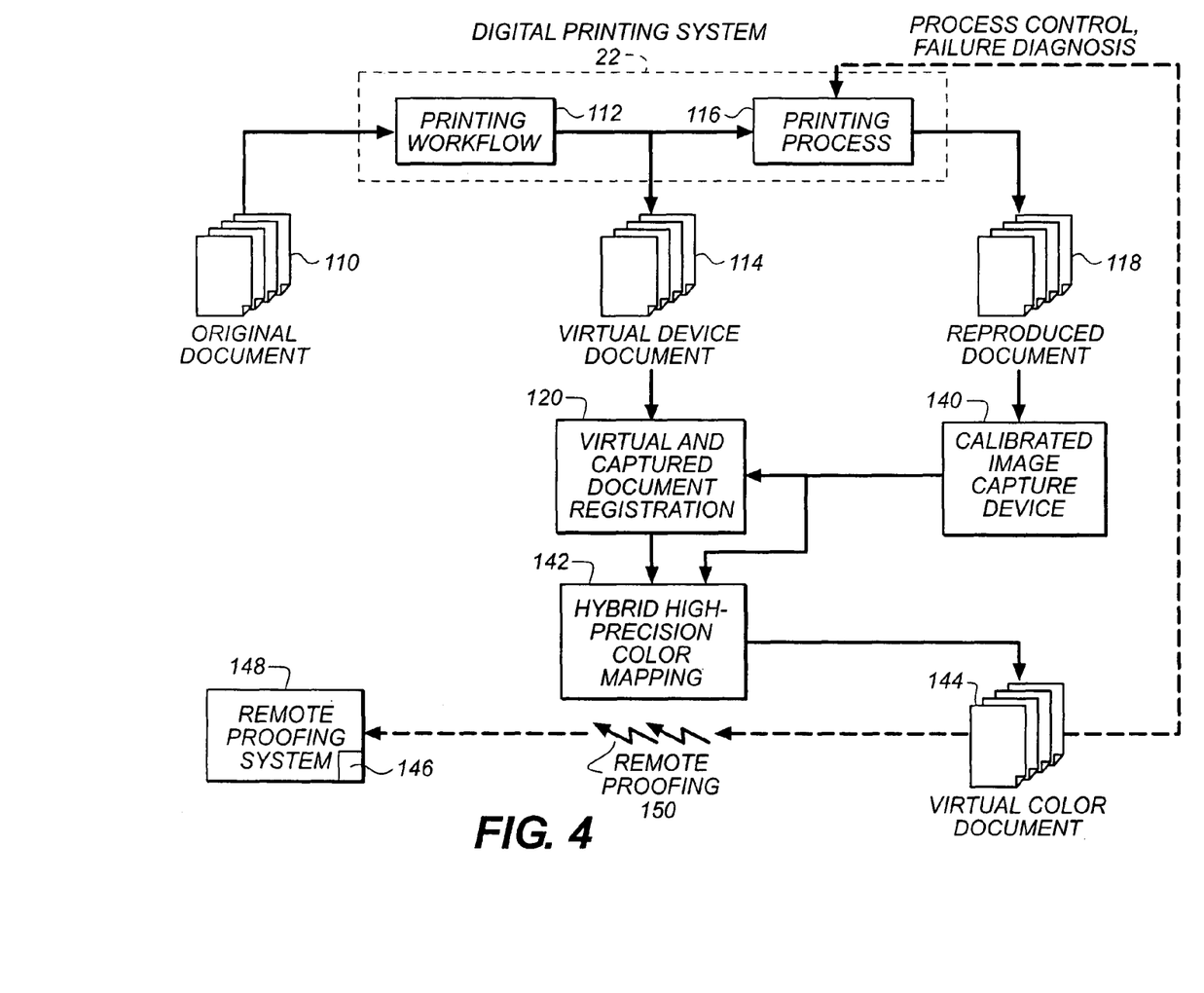
FIG. 4 shows the results of using the image control system according to one aspect of the invention.

One embodiment shown in FIG. 4 uses the image control system 18 in conjunction with high accuracy using hybrid high-precision color mapping 142 to precisely capture the color appearance of the reproduced document 118 as a virtual color document 144. When transmitting the virtual color document 144 to remote proofing devices 146, such as calibrated monitors (soft proof) and/or proof printers (hard proof), in a remote proofing system 148, for quality assurance for remote users that want to perform remote proofing 150 and/or also when transmitting the virtual color document back to the current digital printing device and system for system diagnosis, process control and print artifact tracking such as granularity, mottle, streak, banding, breakdown spots, background/satellite. This method includes combining the signal from the printing workflow, the printing process, and the scanner to construct the hybrid high-precision scanner calibration (HHPSC) 130 automatically by combining the output from the workflow and the printing process to automatically extract the exact printer device value on each pixel. This is done as follows:

1. Identify the basic set of independent colorants, such as CMY, adopted in the current printing system. The remaining colorants can be classified as supplemental colorants i.e. K
2. Construct HHPSC algorithm color mapping function from the scanner output RGB values to the colorimetric color space, such as CIELAB, which will vary depending upon the amount of the supplemental colorants present on that pixel. An image segmentation algorithm is implemented in the printer device space, such as CMYK, based on the output from the Workflow and the Process Controlling system so that it is possible to use any image for the scanner calibration process. This algorithm first identifies the non-overlapping local neighborhoods containing similar printer device color values, and removes small neighborhoods of which color cannot be precisely quantified by a colorimetric measurement device, such as spectrophotometer. The averaged printer device color values and the relative locations are adopted to represent those sampling points.
3. Perform color measurement on the sampling points via a scanner and a colorimetric measurement device. Denote the output from the scanner and the colorimetric measurement device as {RGB} and {LAB}.
4. Hybrid high-precision scanner calibration method, including one or more algorithms, constructs a multidimensional color mapping function from {RGB} and supplemental printer color values to {LAB}.
5. A standard CMYK printing testing target (IT8 target) is printed as two prints on the same machine [One print is used for training purpose and the other is used for testing purpose].
6. Using the training results we can compute the patch lab values of the testing print.
7. Then the ΔE between the computed lab values; and
8. Instrument measured lab values for all the patches are computed.

One test using this method was run in which 100 pages of the standard test target were printed on two different printing systems with the objective is to verify the accuracy of our image control technique.

Because the same colorants were used in both systems, it is only necessary to create one color transformation function for all printed pages. Eleven pages are selected from each set of printed targets. They are first measured by a spectrophotometer, and that was treated as the ground truth. The color mapping accuracy was significantly improved when supplemental colorant information was made available to the scanner. This indicates a significant, often over 50%, improvement in terms of mapping accuracy compared with the common practice of directing mapping the scanner RGB to CIELAB without any virtual device value information.

In one preferred embodiment the image control method 100 includes calibrating the color reproduction device, such as a printer, 12 to a reference color space for color mapping between the printer device space and perceptual color space. This calibration can be used for both printing and remote proofing by using the color image capture device 14, which can includes a scanner, a camera and other image capture devices, with any original document containing graphics, images and/or text. The image control method 100 includes the steps of printing the image with the color reproduction device 12 to create a reproduced document of the image, extracting the output digital virtual printing device document, capturing the reproduced document to produce a scanned document with an image capturing device and then segmenting the extracted virtual printer device document to create a set of ROI (region of interest) wherein the segmentation includes both the automatic and predetermined identification of ROIs. Both the captured reproduced document and the extracted virtual device documents are registered so that the ROIs can be automatically located. The reproduced document is measured with a colorimetric measurement device at the registered ROI value positions to generate colorimetric color values that relate to each ROI and the captured color values. The colorimetric color values, and the virtual device color values are related and compared, by the comparator, to create the color mapping necessary to correct any variations.

After the scanning, segmenting and registering of the reproduced printed document into ROI corresponding to the virtual device document ROI to create a set of measured scanner RGB color values then corrections are made. The correction includes combining a global regression polynomial and local mapping refinement-between the range of continuous captured and virtual device values so that these corrections include values that are mapped. The mapping, from scanned values to colorimetric values, using captured and virtual device values from a continuous range can be implemented by combining a global regression polynomial and local mapping refinement with limited support. The continuous range mapping is used for both the measurement and the devices and does not depend on quantized values, such as those that would be in a LUT (Look Up Table).

Figure 5:
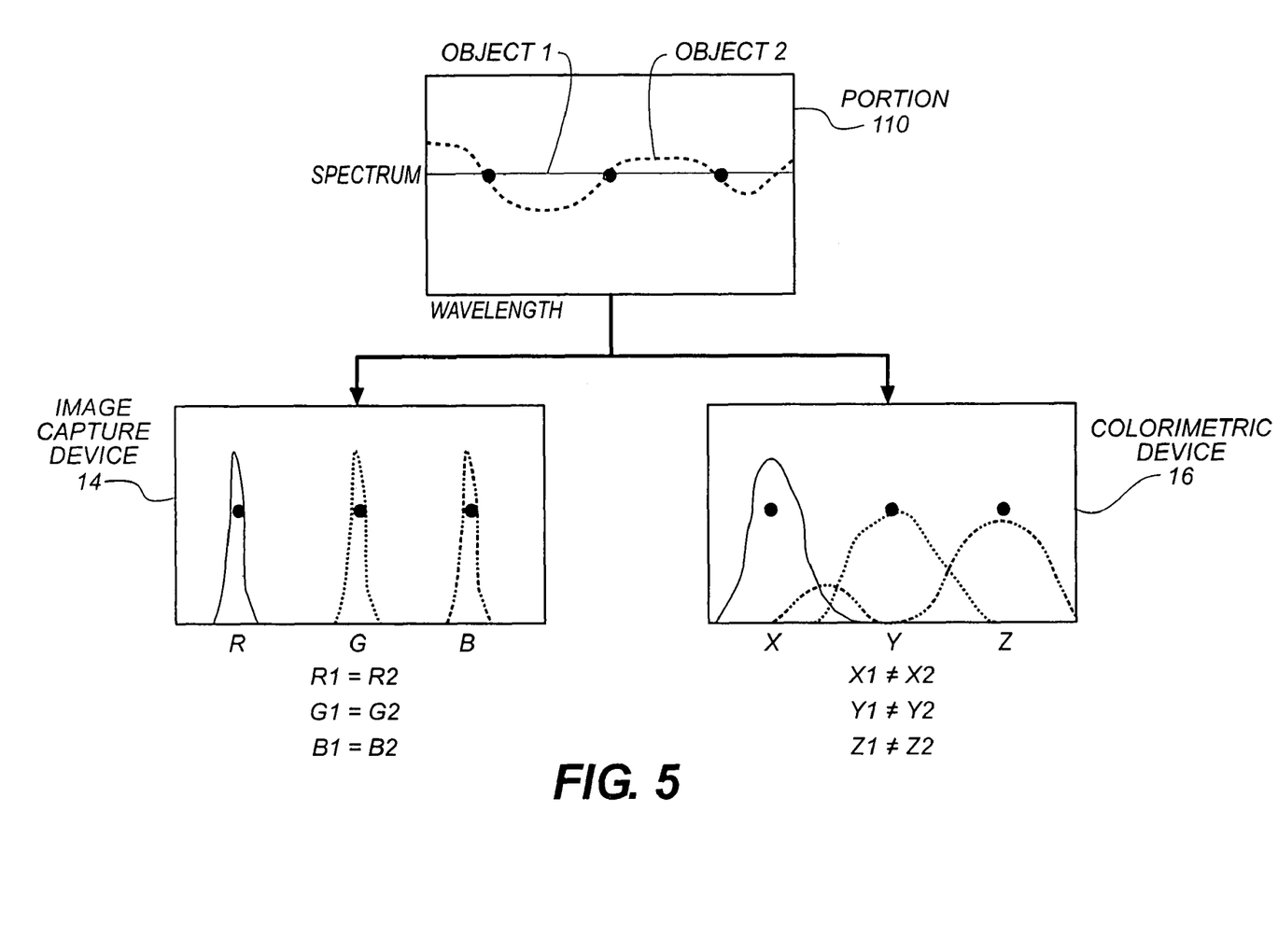
FIG. 5 is a flow chart illustration of the process steps according to one embodiment of the invention.

In another embodiment of the image control method for calibrating a color reproduction device (printer) with high-accuracy, a scanner is used to create a scanner color RGB to printer CIELAB mapping via any original document containing images, graphics and text, including the steps of creating a printed document with a digital printing system and extracting the corresponding printer's virtual device document containing printer device values with the adopted workflow software segmenting the virtual device document to identify ROI values (region of interests), scanning, segmenting and registering the printed reproduced document into aforementioned ROI values according to the identified ROI values on the virtual device document to create a set of measured scanner RGB color values, registering the virtual device document ROI value's to the printed reproduced document, measuring the printed reproduced document with a colorimetric measurement device at the identified ROI value positions to create a colorimetric color values, and relating the measured scanner RGB color values, the colorimetric color values (CIELAB or XYZ), and the virtual printer device values to automatically create the color mapping from the scanner RGB to printer CIELAB (or XYZ) including: combining a global polynomial and local refinement of limited support with input range of continuous scanner and virtual device values as shown for a portion of a document 110 schematically in FIG. 5.

Yet another embodiment of the image control method includes the steps of creating a printed document with a digital printing system and extracting the corresponding printer's virtual device document containing printer device values with the adopted workflow software, segmenting the virtual device document to identify ROIs (region of interests), scanning, segmenting and registering the printed reproduced document into aforementioned ROIs according to the identified ROIs on the virtual device document to create a set of measured camera RGB color values, registering the virtual device document ROI values to the printed reproduced document, measuring the printed reproduced document with a colorimetric measurement device at the identified ROI positions to create a colorimetric color values, and relating the measured camera RGB color values, the colorimetric color values (CIELAB or XYZ), and the virtual printer device values to automatically create the color mapping from the camera RGB to printer CIELAB (or XYZ) with a hybrid mechanism: combining a global polynomial and local refinement of limited support with input range of continuous scanner and virtual device values.

The invention has been described in detail with particular reference to certain preferred embodiments thereof, but it will be understood that variations and modifications can be effected within the spirit and scope of the invention.

The invention claimed is:
1. An image control method using a color reproduction device to a reference color space mapping in conjunction with a color image capture device and an original document containing graphics, images and/or text, the method comprising the steps of:
   a. printing the original document with the color reproduction device to create a reproduced document of the original document;
   b. extracting an output virtual printing device data to facilitate a calibration process and creating an extracted virtual device document;

c. scanning the reproduced document to produce a captured reproduced document with the color image capture device;
d. segmenting the extracted virtual device document to create a set of ROI (region of interest);
e. registering the captured reproduced document with the extracted virtual device document and locating, in a predetermined or automatic manner, a set of ROI values on both the captured reproduced document and the extracted virtual device document that are in registration in order to measure color values of the captured reproduced document in a set of ROI that are in registration with the extracted virtual device document;
f. measuring the captured reproduced document with a colorimetric measurement device at the set of ROI to generate corresponding captured color values;
g. relating the captured color values, colorimetric color values, and the extracted virtual device document having the virtual color values to create an accurate reference color space mapping, from the captured color values to the colorimetric color values, using the captured color values and the virtual color values that accurately define the digitized reproduced document based on human perception to quantify the appearance of the document before printing to allow remote verification of the reproduced document before printing.

2. The image control method of claim 1, the relating step further comprising a means of using global regression polynomial to create the accurate reference color space mapping.

3. The image control method of claim 1, further comprising capturing the color values of the captured reproduced document on a pixel basis to create a full resolution virtual color document.

4. The image control method of claim 3, further comprising a transmitting step for transmitting some or all of the color values of the full resolution virtual color document to one or more of the following remote proofing devices, including calibrated monitors (soft proof) and proof printers (hard proof), for quality assurance use by remote users.

5. The image control method of claim 3, further comprising a transmitting step for transmitting some or all of the color values of the full resolution virtual color document back to a digital printing system for system diagnosis.

6. The image control method of claim 3, further comprising a transmitting step for transmitting some or all of the color values of the full resolution virtual color document back to a current digital printing system for process control.

7. The image control method of claim 3, further comprising a transmitting step for transmitting some or all of the color values of the full resolution virtual color document back to a current digital printing system to control print artifact tracking including one or more of the following: granularity, mottle, streak, banding, breakdown spots, and background or satellite.

8. A method for calibrating a color reproduction device with high-accuracy using a scanner by creating a scanner color RGB to printer CIELAB mapping using an original document containing one or more of an image, graphics and text, comprising the steps of:

a. creating a printed document with a digital printing system and extracting a corresponding printer virtual device document comprising virtual values that represents the original document;
b. segmenting the virtual device document to identify one or more region of interest (ROI) to create a virtual device document ROI;
c. scanning, the printed document into ROI corresponding to the virtual device document to create a captured reproduced document and segmenting the captured reproduced document into captured ROI so that the captured reproduced document is segmented and each segment has a set of measured scanner RGB color values and one or more captured RGB color values in that segment;
d. registering the virtual device document ROI to the printed document;
e. measuring the printed document with a colorimetric measurement device at one or more identified captured ROI positions to create measured colorimetric color values;
f. relating the set of measured scanner and the captured RGB color values, the measured colorimetric color values (CIELAB or XYZ), and the captured RGB color values to automatically create an accurate color mapping from the scanner color RGB to the measured colorimetric color values (CIELAB or XYZ) by extrapolating between each set of measured scanner RGB color values and the RGB color values to form a continuous range of the RGB color values so that those of measured scanner RGB color values is compared to the captured RGB color values and if there are any new values to be created that is done by interpretation of the continuous range of the RGB color values to fill in missing color values.

9. The image control method of claim 8, the relating step further comprising a global regression polynomial.

10. The image control method of claim 8, further comprising capturing the color values of the captured reproduced document a full resolution virtual color document.

11. The image control method of claim 10, further comprising a transmitting step for transmitting some or all of the color values of the virtual full resolution color document to one or more of the following remote proofing devices, including calibrated monitors (soft proof) and proof printers (hard proof), for quality assurance use by remote users.

12. The image control method of claim 10, further comprising a transmitting step for transmitting some or all of the color values of the full resolution virtual color document back to a digital printing system for system diagnosis.

13. The image control method of claim 10, further comprising a transmitting step for transmitting some or all of the color values of the full resolution virtual color document back to a current digital printing system for process control.

14. The image control method of claim 10, further comprising a transmitting step for transmitting some or all of the color values of the full resolution virtual color document back to a current digital printing system to control print artifacts.

* * * * *